3,847,908
6-STYRYLPYRAZOLO[3,4-d]PYRIMIDINONES AND PYRIMIDINES
Hermann Breuer and Uwe D. Treuner, Regensburg, Germany, assignors to E. R. Squibb & Sons, Inc., Princeton, N.J.
No Drawing. Filed Mar. 5, 1973, Ser. No. 337,807
Int. Cl. C09d 23/14
U.S. Cl. 260—240 D                13 Claims

ABSTRACT OF THE DISCLOSURE

6 - Styrylpyrazolo[3,4-d]pyrimidin-4-ones of the general formula

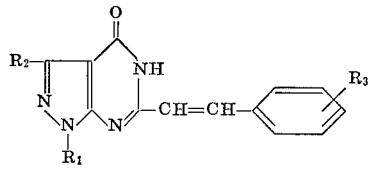

and the 6-styrylpyrazolo[3,4-d]pyrimidines which are derived from them, having the general formula

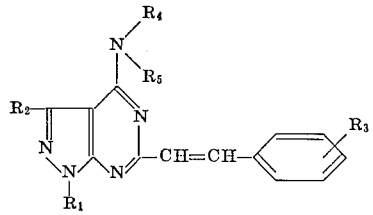

are useful as antimicrobial agents and also have antiinflammatory and membrane stabilizing properties.

SUMMARY OF THE INVENTION

This invention relates to 6-styrylpyrazolo[3,4-d]pyrimidin-4-ones which have the formula (I)
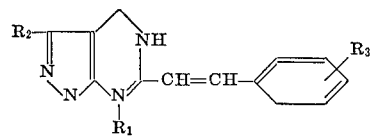

and to the 6-styrylpyrazolo[3,4-d]pyrimidines which are obtained from them and which have the formula (II)
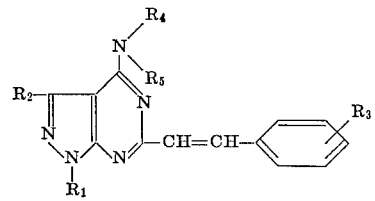

The symbols have the following meanings in formulas I and II, as well as throughout this specification.

$R_1$ is lower alkyl, cyclo-lower alkyl or phenyl-lower alkyl.

$R_2$ is hydrogen or lower alkyl.

$R_3$ is hydrogen, lower alkyl, halogen or trifluoromethyl.

$R_4$ and $R_5$ each is hydrogen, lower alkyl, hydroxy-lower alkyl or di-lower alkylamino-lower alkyl. In addition, the radical

together is morpholino, piperidino or lower alkylpiperidino.

DETAILED DESCRIPTION OF THE INVENTION

The lower alkyl groups in the various radicals represented by the symbols are straight or branched chain aliphatic hydrocarbon groups having one to seven carbon atoms, for example, methyl, ethyl, propyl, isopropyl, butyl, t-butyl, amyl and the like, the one to four carbon groups being preferred.

The cyclo-lower alkyl groups are the four to six carbon alicyclics cyclobutyl, cyclopentyl and cyclohexyl, the last two being preferred.

The phenyl-lower alkyl groups include lower alkyl groups of the kind described above, but benzyl and phenethyl are preferred, especially the first.

All four of the common halogens are contemplated. Chlorine, bromine and fluorine are preferred within that group, but especially chlorine.

The basic radical

includes such groups as amino, lower alkylamino, e.g., methylamino, ethylamino, propylamino, butylamino, etc., di-lower alkylamino, e.g., dimethylamino, diethylamino, dipropylamino, dibutylamino, etc., hydroxy-lower alkylamino, e.g., hydroxyethylamino, di(hydroxy-lower alkyl) amino, e.g., di(hydroxyethyl)amino, di(lower alkyl) amino-lower alkyl, e.g., dimethylaminomethyl, diethylaminomethyl, dipropylaminomethyl, dimethylaminoethyl, diethylaminoethyl, dipropylaminoethyl, dimethylaminopropyl, and the like (the one to three carbon alkyls are preferred, especially those groups named). Preferably there is only one of the bulkier groups. In addition, $R_4$ and $R_5$ join together with the nitrogen to form one of the heterocyclic groups morpholino, piperidino or lower alkylpiperidino, e.g., $N^4$-methylpiperidino or $N^4$-ethylpiperidino.

When there is a basic side chain, in the 4-position, acid addition salts are formed and these are also within the scope of the invention.

The lower alkyl groups represented by the various symbols are saturated hydrocarbon radicals of up to seven carbon atoms like methyl, ethyl, propyl, isopropyl, butyl, isobutyl, t-butyl and the like. The cyclo-lower alkyl groups are three to seven alicyclics cyclopropyl to cycloheptyl. The five and six carbon members are preferred. All four halogens are included but chlorine and bromine are preferred.

DETAILED DESCRIPTION OF THE INVENTION

The products of this invention are produced by the following series of reactions (the symbols are the same as described above).

A 5-amino-4-cyanopyrazole of the formula (III)
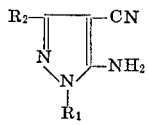

is produced by reacting a dicyano compound of the formula (IV)
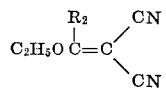

with a hydrazide $H_2N$—$NH$—$R_1$ in alcohol at about reflux temperature.

This 5-amino-4-cyanopyrazole is made to react with a cinnamoyl halide of the formula (V) 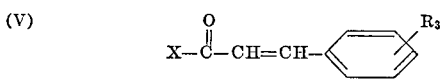

wherein X is halogen, preferably chlorine, in an inert organic solvent such as dioxane, in the presence of an organic base such as pyridine, to obtain a 5-cinnamoyl-amino-4-cyanopyrazole of the formula (VI) 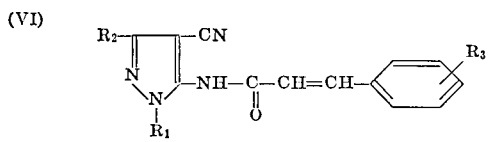

Treatment of the product of formula VI with an alkali metal hydroxide like potassium hydroxide, and an oxidizing agent like hydrogen peroxide yields the 6-styrylpyrazolo[3,4-d]-pyrimidin-4-one of formula I.

By treatment of a compound of formula I with a halogenating agent, e.g., phosphorus halides like phosphorus oxychloride and phosphorus pentachloride, this compound is converted to a intermediate halogenated compound of the formula (VII) 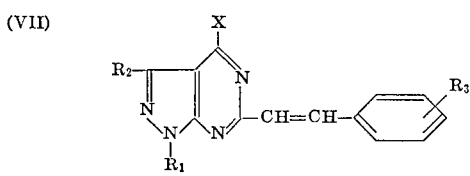

The product of formula II is then obtained by treating the halogenated compound of formula VII with an amine (VIII) 

e.g., in an inert organic solvent like toluene, preferably at an elevated temperature, e.g., up to reflux temperature.

The products with basic side chains, especially when there is a di-lower alkylamino-lower alkyl group, form the acid addition salts referred to above, for example, by reaction with an ethereal solution containing an equivalent proportion of the appropriate acid. The acid addition salts include the commonly known salts such as hydrohalides, especially hydrochloride and hydrobromide, sulfate, nitrate, phosphate, and the like as well as organic acid salts like acetate, citrate, succinate, benzoate, salicylate, malate, citrate and the other well known members.

Certain of the compounds herein exist in isomeric forms and these are included within the scope of the invention.

The new compounds of this invention are useful as antimicrobial agents and may be used to combat infections in animal species, such as mice, rats, dogs, guinea pigs and the like, due to organisms such as *Trichomonas vaginalis, Candida albicans, Trichomonas foetus, Staphylococcus aureus, Salmonella schottmuelleri, Proteus vulgaris, Escherichia coli* or *Trichophyton mentagrophytes*. For example, a compound of formula I or of formula II or physiologically acceptable acid addition salt thereof may be administered orally to an infected animal, e.g., to a mouse, in an amount of about 5 to 25 mg. per kg. per day in 2 to 4 divided doses. These may be conventionally formulated in a tablet, capsule or elixir containing about 10 to 250 mg. per dosage unit, by compounding the active substance or substances with the conventional excipient, vehicle, binder, perservative, flavor, etc. as called for by accepted pharmaceutical practice. They may also be applied topically, e.g., to dermatophytosis in a guinea pig, in a lotion, salve or cream at a concentration of about 0.01 to 3 percent by weight.

The new compounds of this invention, especially those of formula II, also have antiinflammatory properties and are useful as antiinflammatory agents, for example, to reduce local inflammatory conditions such as those of an edematous nature or resulting from proliferation of connective tissue in various mammalian species such as rats, dogs and the like when given orally in dosages of about 5 to 50 mg./kg./day, preferably 5 to 25 mg./kg./day, in single or 2 to 4 divided doses, as indicated by the carageenan edema assay in rats. The active substance may be utilized in compositions such as tablets, capsules, solutions or suspensions containing up to about 300 mg. per units of dosage of a compound or mixture of compounds of formula II or physiologically acceptable acid addition salt thereof. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion or cream may also be used. The compounds also have membrane stabilizing properties.

The following examples are illustrative of the invention. Additional members of the class are produced in the same manner by simple substitution of the reactants having the appropriate R group. All temperatures are on the centigrade scale.

Example 1

(a) 1-Methyl-4-cyano-5-aminopyrazole.—To a solution of 70 grams of 98% methyl hydrazine and 700 ml. of ethanol are added 127 gms. of ethoxy methylene malonitrile in such a manner that the solution remains at the boiling point. After completion of the addition the reaction mixture is heated to reflux for 30 minutes. The product is permitted to crystallize overnight in the refrigerator. After filtering under suction and washing with a small amount of cold ethanol 103 gms. of crude 5-amino-4-cyano-1-methylpyrazole remains as yellow crystals, m.p. 216–218°.

(b) Trans-1-methyl - 4 - cyano-5-cinnamoylaminopyrazole.—6.1 g. of 1-methyl-4-cyano-5-aminopyrazole in 250 ml. of dioxane and 2.5 ml. of pyridine are stirred for one hour with 8.6 g. of cinnamoyl chloride at 10°–15° and then heated at 100° for an additional 30 minutes. After distilling off the solvent, the oily residue is treated with methanol-water (1:1) until it solidifies. The light yellow solid is then filtered under suction, thoroughly washed with water, dried and recrystallized from methanol; yield 7 g. of light yellow crystals of trans-1-methyl-4-cyano-5-cinnamoylaminopyrazole, m.p. 161–165°.

The following additional 1-methyl-4-cyano-5-cinnamoylaminopyrazoles are obtained by the foregoing procedure by substituting for the cinnamoyl chloride the chloro substituted cinnamoyl chloride and in the case of compounds (c) to (f) which follow, substituting 1,3-dimethyl-4-cyano-5-aminopyrazole for the 1 - methyl - 4 - cyano-5-amino-pyrazole:

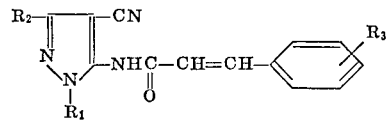

|     | R₁  | R₂  | R₃   | M.P., degrees | Appearance |
|-----|-----|-----|------|---------------|------------|
| (c) | CH₃ | CH₃ | H    | 222–225       | Yellow crystals. |
| (d) | CH₃ | CH₃ | o-Cl | 240–242       | Do. |
| (e) | CH₃ | CH₃ | m-Cl | 188–190       | Do. |
| (f) | CH₃ | CH₃ | p-Cl | 214–217       | Do. |
| (g) | CH₃ | H   | o-Cl | 217–219       | Do. |
| (h) | CH₃ | H   | m-Cl | 170–172       | Do. |
| (i) | CH₃ | H   | p-Cl | 194–198       | Do. |

(j) 1,5-Dihydro-1-methyl - 6 - styryl - 4H - pyrazolo [3,4-d]pyrimidin-4-one.—6.2 g. of 1-methyl-4-cyano-5-cinnamoylaminopyrazole, 90 ml. of 3% hydrogen peroxide and 2.5 g. of potassium hydroxide are maintained at 70–75° for three hours. After cooling, the reaction mixture is acidified with acetic acid and the 1,5-dihydro-1-methyl-6-styryl-4H-pyrazolo[3,4 - d]pyrimidin - 4 - one precipitates as a light yellow precipitate. Recrystallization from methyl glycol gives 4 g. of light yellow needles, m.p. 279–282°.

By utilizing the intermediate (c) to (i), respectively in the procedure of part (j) above, the following additional compounds are obtained.

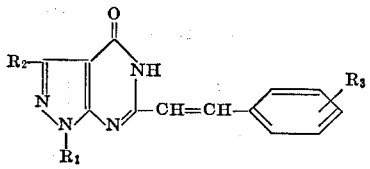

| | $R_1$ | $R_2$ | $R_3$ | M.P., degrees | Appearance |
|---|---|---|---|---|---|
| (k) | $CH_3$ | $CH_3$ | H | 305–308 | Yellow crystals. |
| (l) | $CH_3$ | $CH_3$ | o-Cl | 307–308 | Do. |
| (m) | $CH_3$ | $CH_3$ | m-Cl | 308–311 | Do. |
| (n) | $CH_3$ | $CH_3$ | p-Cl | 341–342 | Cream needles. |
| (o) | $CH_3$ | H | o-Cl | 305–307 | Yellow needles. |
| (p) | $CH_3$ | H | m-Cl | 297–298 | Do. |
| (q) | $CH_3$ | H | p-Cl | 307–310 | White powder. |

Example 2

(a) 4-Chloro-6-(p - chlorostyryl) - 1 - methyl - 1H-pyrazolo[3,4-d]pyrimidine.—3.2 g. of 1,5 - dihydro - 1-methyl-6-(p-chlorostyryl)-4H-pyrazolo[3,4 - d]pyrimidin-4-one in 30 ml. of phosphorus oxychloride is refluxed with 3 g. of phosphorus pentachloride for three hours. The excess phosphorus oxychloride is then distilled off and the cooled residue is stirred with ice water whereupon white crystals separate. After thorough washing with ice water, the crystals are dried and recrystallized from cyclohexane. 2.8 g. of white crystalline 4-chloro-6-(p-chlorostyryl)-1-methyl-1H-pyrazolo[3,4-d]pyrimidine are obtained, m.p. 152–154°.

(b) 4-chloro-6-(m - chlorostyryl) - 1 - methyl - 1H-pyrazolo[3,4-d]pyrimidine.—20 g. of 1,5 - dihydro - 1-methyl-6-(m-chlorostyryl)-4H - pyrazolo[3,4 - d]pyrimidin-4-one in 30 ml. of phosphorus oxychloride and 30 g. of phosphorus pentachloride are maintained at reflux temperature for three hours. After working up the product as in part (a) 17.2 g. of white crystalline 4-chloro-6-(m-chlorostyryl)-1-methyl-1H - pyrazolo[3,4 - d]pyrimidine are obtained, m.p. 172–174°.

The following additional compounds are obtained by the same procedure from the products of Example 1:

| | $R_1$ | $R_2$ | $R_3$ | M.P., degrees | Appearance |
|---|---|---|---|---|---|
| (c) | $CH_3$ | $CH_3$ | o-Cl | 152–154 | White powder. |
| (d) | $CH_3$ | $CH_3$ | m-Cl | 140–142 | Yellow needles. |
| (e) | $CH_3$ | $CH_3$ | p-Cl | 128–130 | White crystals. |

(f) 4-(n-Butylamino)-6-(m-chlorostyryl) - 1 - methyl-1H-pyrazolo[3,4-d]pyrimidine.—3 g. of 4-chloro-6-(m-chlorostyryl)-1-methyl-1H-pyrazolo[3,4 - d]pyrimidine in 30 ml. of toluene and 1.45 g. of n-butylamine are refluxed for one hour. The reaction mixture is filtered and the filtrate is concentrated. The solid yellow residue is crystallized from methanol to obtain 1.9 g. of 4-(n-butylamino)-6-(m-chlorostyryl)-1 - methyl - 1H - pyrazolo [3,4 - d] pyrimidine as light yellow needles, m.p. 162–164°.

By utilizing the products of Examples 1 and substituting for the n-buytlamine the appropriate amine in the foregoing procedure, the following additional products are obtained:

| | $R_1$ | $R_2$ | $R_3$ | $R_4$ / $R_5$ | M.P., degrees | Appearance |
|---|---|---|---|---|---|---|
| (g) | $CH_3$ | H | p-Cl | $-NH-(CH_2)_3-CH_3$ | 69–72 | Light yellow crystals. |
| (h) | $CH_3$ | $CH_3$ | o-Cl | $-N\diagdown\diagup O$ (morpholino) | 114–115 | White powder. |
| (i) | $CH_3$ | $CH_3$ | m-Cl | $-NH-(CH_2)_3-CH_3$ | 130–132 | White crystals. |
| (j) | $CH_3$ | H | p-Cl | $-NH-(CH_2)_3)_2$ | 88–90 | Do. |
| (k) | $CH_3$ | $CH_3$ | o-Cl | $-NH-(CH_2)_3-N(CH_3)_2$ | 128–130 | Do. |
| (l) | $CH_3$ | H | o-Cl | $-NH-(CH_2)_3-N(CH_3)_2$ | 90 | Do. |
| (m) | $CH_3$ | H | o-Cl | $-NH-(CH_2)_3-CH_3$ | 120–122 | Do. |
| (n) | $CH_3$ | $CH_3$ | o-Cl | $-NH-(CH_2)_3-CH_3$ | 123 | Do. |

The hydrochloride salts of the products of (k) and (l) above are formed by dissolving the crystals in ethanol, adding an equivalent amount of hydrogen chloride in ether solution, then precipitating the salt by the addition of more ether.

Example 3

The following additional products are obtained by the procedure of Example 1 by utilizing the $R_1$, $R_2$ substituted-4-cyano-5-aminopyrazole and R₃-substituted cinnamoyl chloride:

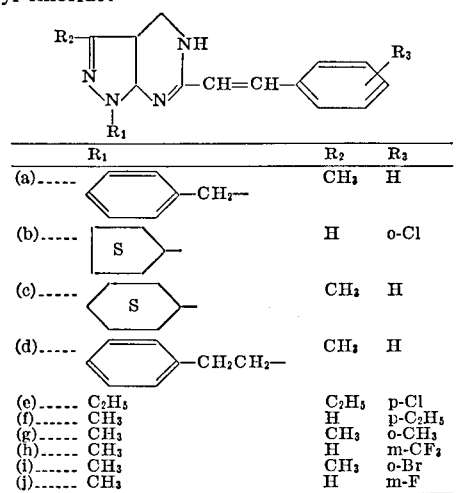

| | R₁ | R₂ | R₃ |
|---|---|---|---|
| (a) | –CH₂–⌬ | CH₃ | H |
| (b) | ⌬S | H | o-Cl |
| (c) | ⌬S | CH₃ | H |
| (d) | –CH₂CH₂–⌬ | CH₃ | H |
| (e) | C₂H₅ | C₂H₅ | p-Cl |
| (f) | CH₃ | H | p-C₂H₅ |
| (g) | CH₃ | CH₃ | o-CH₃ |
| (h) | CH₃ | H | m-CF₃ |
| (i) | CH₃ | CH₃ | o-Br |
| (j) | CH₃ | H | m-F |

Example 4

The following additional products are obtained by the procedure of Example 2 from the products of Example 1 and Example 3 but substituting for the n-butylamine the amine

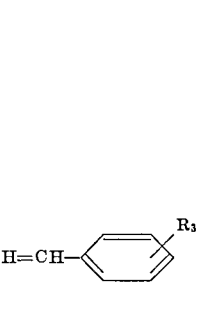

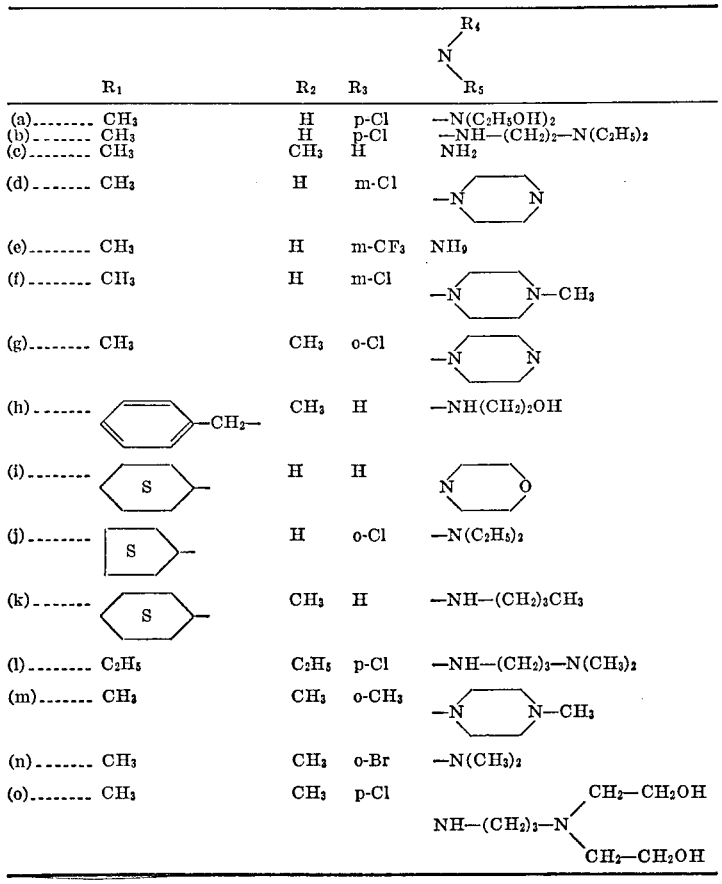

| | R₁ | R₂ | R₃ | N(R₄)(R₅) |
|---|---|---|---|---|
| (a) | CH₃ | H | p-Cl | —N(C₂H₅OH)₂ |
| (b) | CH₃ | H | p-Cl | —NH—(CH₂)₂—N(C₂H₅)₂ |
| (c) | CH₃ | CH₃ | H | NH₂ |
| (d) | CH₃ | H | m-Cl | —N⟨piperazine⟩N |
| (e) | CH₃ | H | m-CF₃ | NH₂ |
| (f) | CH₃ | H | m-Cl | —N⟨⟩N—CH₃ |
| (g) | CH₃ | CH₃ | o-Cl | —N⟨⟩N |
| (h) | –CH₂–⌬ | CH₃ | H | —NH(CH₂)₂OH |
| (i) | ⌬S | H | H | —N⟨⟩O |
| (j) | ⌬S | H | o-Cl | —N(C₂H₅)₂ |
| (k) | ⌬S | CH₃ | H | —NH—(CH₂)₃CH₃ |
| (l) | C₂H₅ | C₂H₅ | p-Cl | —NH—(CH₂)₃—N(CH₃)₂ |
| (m) | CH₃ | CH₃ | o-CH₃ | —N⟨⟩N—CH₃ |
| (n) | CH₃ | CH₃ | o-Br | —N(CH₃)₂ |
| (o) | CH₃ | CH₃ | p-Cl | NH—(CH₂)₃—N(CH₂—CH₂OH)(CH₂—CH₂OH) |

What is claimed is:

1. A compound of the formula

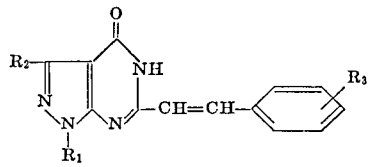

wherein $R_1$ is lower alkyl, cyclo-lower alkyl or phenyl-lower alkyl; $R_2$ is hydrogen or lower alkyl and $R_3$ is hydrogen, lower alkyl, halogen or trifluoromethyl.

2. A compound of the formula

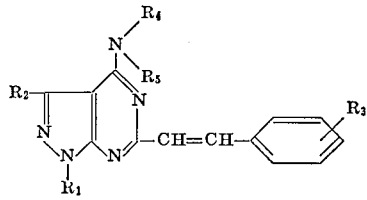

wherein $R_1$, $R_2$, and $R_3$ have the same meaning as in Claim 1 and $R_4$ and $R_5$ each is hydrogen, lower alkyl, hydroxy-lower, di-lower alkylamino-lower alkyl or together with the nitrogen are morpholino, piperidino or lower alkylpiperidino, and acid addition salts of the basic members.

3. A compound as in Claim 1 wherein $R_1$ and $R_2$ each is lower alkyl and $R_3$ is halogen.

4. A compound as in Claim 1 wherein $R_1$ is lower alkyl, $R_2$ is hydrogen and $R_3$ is halogen.

5. A compound as in Claim 3 wherein each lower alkyl group is methyl and the halogen is chlorine.

6. A compound as in Claim 2 wherein $R_1$ and $R_2$ each is lower alkyl, $R_3$ is halogen and

is lower alkylamino.

7. A compound as in Claim 2 wherein $R_1$ is lower alkyl, $R_2$ is hydrogen, $R_3$ is halogen and

is lower alkylamino.

8. A compound as in Claim 6 wherein each lower alkyl group is methyl, the halogen is chlorine and the lower alkylamino group is butylamino.

9. A compound as in Claim 7 wherein the lower alkyl group is methyl, the halogen is chlorine and the lower alkylamino group is butylamino.

10. A compound as in Claim 2 wherein $R_1$ and $R_2$ each is lower alkyl, $R_3$ is halogen and

is di-lower alkylamino-lower alkyl.

11. A compound as in Claim 2 wherein $R_1$ is lower alkyl, $R_2$ is hydrogen, $R_3$ is halogen and

is di-lower alkylamino-lower alkyl.

12. A compound as in Claim 10 wherein each lower alkyl group is methyl, the halogen is chlorine and the di-lower alkylamino-lower alkyl group is dimethylaminopropylamino.

13. A compound as in Claim 11 wherein the lower alkyl group is methyl, the halogen is chlorine and the di-lower alkylamino-lower alkyl group is dimethylaminopropylamino.

References Cited
UNITED STATES PATENTS

| | | |
|---|---|---|
| 3,165,520 | 1/1965 | Schmidt et al. ____ 260—256.4 F |
| 3,211,732 | 10/1965 | Schmidt et al. ____ 260—256.4 F |
| 3,732,225 | 5/1973 | Breur et al. _____ 260—256.4 F |

JOHN D. RANDOLPH, Primary Examiner

U.S. Cl. X.R.

424—251; 260—310 R

UNITED STATES PATENT AND TRADEMARK OFFICE
CERTIFICATE OF CORRECTION

PATENT NO. : 3,847,908
DATED : November 12, 1974
INVENTOR(S) : Hermann Breuer, Uwe D. Treuner It is certified that error appears in the above–identified patent and that said Letters Patent are hereby corrected as shown below:

Column 1, formula (I)--  should be

Column 2, line 1, (2 occurrences) line 39, line 40, (2 occurrences) line 41 -- piperidino -- should be "piperazino".
Column 4, line 34 -- malo -- should be "malono".
Column 6, line 5 -- 17.2 g. -- should be "17.3 g."
Column 6, in the second table (j) under

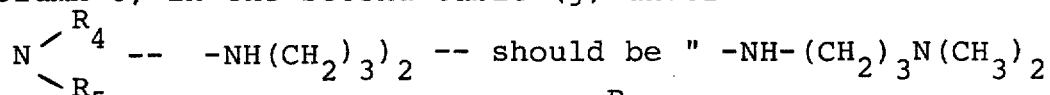

Column 7, Example 4 (e) under 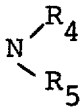

Column 8, line 30 (2 occurrences) --piperidino-- should be "piperazino".

Signed and Sealed this

Thirty-first Day of August 1976

[SEAL]

Attest:

RUTH C. MASON
*Attesting Officer*

C. MARSHALL DANN
*Commissioner of Patents and Trademarks*